(12) United States Patent
Basu et al.

(10) Patent No.: US 12,211,263 B2
(45) Date of Patent: Jan. 28, 2025

(54) SYSTEM AND METHOD FOR ASSESSING PIXELS OF SATELLITE IMAGES OF AGRICULTURE LAND PARCEL USING AI

(71) Applicant: Satsure Analytics India Private Limited, Bangalore (IN)

(72) Inventors: Prateep Basu, Bangalore (IN); Rashmit Singh Sukhmani, Bangalore (IN); Krishna G Nambhothiri, Bangalore (IN); Bharat Aggarwal, Bangalore (IN)

(73) Assignee: SATSURE ANALYTICS INDIA PRIVATE LIMITED, Bangalore (IN)

( * ) Notice: Subject to any disclaimer, the term of this patent is extended or adjusted under 35 U.S.C. 154(b) by 426 days.

(21) Appl. No.: 17/547,095

(22) Filed: Dec. 9, 2021

(65) Prior Publication Data
US 2023/0162496 A1    May 25, 2023

(30) Foreign Application Priority Data
Nov. 24, 2021 (IN) .............................. 202141054320

(51) Int. Cl.
*G06V 20/13* (2022.01)
*G06T 7/10* (2017.01)
(Continued)

(52) U.S. Cl.
CPC .............. *G06V 20/13* (2022.01); *G06T 7/10* (2017.01); *G06T 11/00* (2013.01); *G06V 10/764* (2022.01);
(Continued)

(58) Field of Classification Search
CPC ...... G06V 20/13; G06V 10/764; G06V 20/17; G06V 20/188; G06V 20/194; G06T 7/10;
(Continued)

(56) References Cited

U.S. PATENT DOCUMENTS

2017/0084039 A1*  3/2017  Ritter .................... G06T 7/194
2021/0042523 A1*  2/2021  Rozenstein ........... G06T 7/0016
(Continued)

OTHER PUBLICATIONS

Talukdar S, Singha P, Mahato S, Shahfahad, Pal S, Liou Y-A, Rahman A. Land-Use Land-Cover Classification by Machine Learning Classifiers for Satellite Observations—A Review. Remote Sensing. 2020; 12(7):1135. https://doi.org/10.3390/rs12071135 (Year: 2020).*

(Continued)

*Primary Examiner* — Ross Varndell
*Assistant Examiner* — Andrew B. Jones

(57) ABSTRACT

A system and method for assessing categorized pixels of satellite images associated with agriculture land parcel using an artificial intelligence (AI) model are provided. The method includes, (i) obtaining satellite images associated with agriculture land parcel; (ii) pre-processing the satellite images to generate pre-processed satellite images, (iii) training the AI model by categorizing historical plurality of pixels from historical plurality of satellite images based on historical satellite data and correlating historical scores to historical categorized pixels to obtain trained AI model, (iv) classifying pixels of pre-processed satellite images into crop area-pixels and non-crop area pixels by determining a profile of time series data that corresponds to at least one of normalized difference vegetation index, normalized difference water index, land surface temperature, modified normalized difference water index, or land surface water index, (v) determining, using trained AI model, categorized pixels based on classification, (vi) assessing categorized pixels with a score.

15 Claims, 9 Drawing Sheets

(51) Int. Cl.
*G06T 11/00* (2006.01)
*G06V 10/764* (2022.01)

(52) U.S. Cl.
CPC .............. *G06T 2207/10036* (2013.01); *G06T 2207/20081* (2013.01); *G06T 2207/30188* (2013.01); *G06T 2207/30192* (2013.01)

(58) Field of Classification Search
CPC ........... G06T 11/00; G06T 2207/10036; G06T 2207/20081; G06T 2207/30188; G06T 2207/30192
See application file for complete search history.

(56) References Cited

U.S. PATENT DOCUMENTS

2021/0256640 A1* 8/2021 Bussmann ........... G06Q 30/018
2023/0091677 A1* 3/2023 Brown ................... G06N 20/00
702/2

OTHER PUBLICATIONS

L. Viskovic "Crop Classification using Multi-spectral and Multitemporal Satellite Imagery with Machine Learning," 2019 International Conference on Software, Telecommunications and Computer Networks (SoftCOM), Split, Croatia, 2019, pp. 1-5, doi: 10.23919/SOFTCOM. 2019.8903738 (Year: 2019).*

* cited by examiner

SYSTEM AND METHOD FOR ASSESSING PIXELS OF SATELLITE IMAGES OF AGRICULTURE LAND PARCEL USING AI

TECHNICAL FIELD

The embodiments herein generally relate to categorizing pixels using an artificial intelligence (AI) model, more particularly, a system and method of categorizing pixels of satellite images for determining a score to assess the agriculture land parcel using the AI model.

DESCRIPTION OF THE RELATED ART

Satellite Images are an essential source of information. With technological advancements in satellites, global information systems, aviation, digital photography, computer technology, and telecommunications, high-resolution satellite images, and aerial photographs are nowadays available virtually to everyone. However, obtaining satellite imagery for generating using earth observation data is extremely challenging, time-consuming, and expensive. The data from various satellites that are available free of cost publicly has its own set of discrepancies. Satellites generate earth observation data in an electromagnetic spectrum. Due to environmental factors, there is data loss, and insufficient data is obtained from the satellites at certain timestamps. The data loss or insufficient data might affect band data and analytics that are related to any practical application. Using the earth observation data, agriculture land parcels that are used for agriculture may be assessed for better yields. Based on the assessment, farmers may easily approach loans to some agri lending institutions.

Some traditional approaches are used to assess the farmers based on their performance, track record of their progress across years, and comparison of the revenue potential of individual crops. Some other approaches fail to measure performance comparison over years, a number of times land is cultivated in a year, etc for assessing an agricultural land.

Some existing techniques are using financial history and some alternate data that relates to the farmer to assist the agri lending institutions in providing loans.

Therefore, there arises a need to address the aforementioned technical drawbacks in existing technologies in processing satellite images for assessing an agriculture land parcel used for agriculture.

SUMMARY

In view of foregoing an embodiment herein provides a processor-implemented method for assessing categorized pixels of one or more satellite images associated with an agriculture land parcel based on satellite data using an artificial intelligence (AI) model. The method includes obtaining one or more satellite images associated with the agriculture land parcel from one or more satellites. In some embodiments, the one or more satellite images includes a first set of satellite images that are captured in a first set of spectral bands by a first satellite, a second set of satellite images that are captured in a second set of spectral bands by a second satellite and a third set of satellite images that are captured in a third set of spectral bands by a third satellite. The method includes, pre-processing the one or more satellite images associated with the agriculture land parcel to generate a pre-processed one or more satellite images using an image pre-processing technique. In some embodiments, the pre-processed one or more satellite images includes satellite data. In some embodiments, the satellite data includes at least one of a normalized difference vegetation index (NDVI), a normalized difference water index (NDWI), a land surface temperature (LST), a modified a normalized difference water index (MNDWI), or a land surface water index (LSWI). The method includes training the AI model by categorizing a historical plurality of pixels from a historical plurality of satellite images based on a historical satellite data and correlating a historical scores with a historical categorized pixels to obtain a trained AI model. The method includes classifying, using an image segmentation technique, the one or more pixels of the pre-processed one or more satellite images into crop area-pixels that have a crop and non-crop area pixels that do not have the crop by determining a profile of time series data that corresponds to at least one of a normalized difference vegetation index (NDVI), a normalized difference water index (NDWI), a land surface temperature (LST), a modified normalized difference water index (MNDWI), or a land surface water index (LSWI) of at least one pixel of the pre-processed one or more satellite images. The method includes determining, using the trained AI model, the categorized pixels based on classification of the one or more pixels, the categorized pixels include at least one of the crop area pixels or the non-crop area pixels for the at least one season. The method includes assessing, using the trained AI model, the categorized pixels of the one or more satellite images associated with the agriculture land parcel with a score based on the satellite data.

In some embodiments, the method includes pre-processing one or more images to obtain a pre-processed one or more images by, (i) obtaining atmospherically corrected first set of images and atmospherically corrected second set of images by applying atmospheric corrections to remove effects of atmosphere on the first set of images and the second set of images, (ii) adjusting a band adjusted first set of satellite images according to a band of the second set of images using surface properties of the agriculture land parcel based on land co-ordinates of the atmospherically corrected first set of images and the atmospherically corrected second set of images, (iii) marking at least one cloudy and shadow pixels in the cloudy image of the first set of images to obtain a marked cloudy image, (iv) generating a reconstructed image from the marked cloudy image of the first set of images by replacing the at least one cloudy and shadow pixels in the third set of images, and (v) determining, using the image processing technique, the satellite data from the reconstructed image of the agriculture land parcel.

In some embodiments, the satellite data includes at least one of a normalized difference vegetation index (NDVI), a normalized difference water index (NDWI), a land surface temperature (LST), a modified a normalized difference water index (MNDWI), or a land surface water index (LSWI).

In some embodiments, the method includes determining one or more seasonal parameters based on the category of one or more pixels by, (i) determining an intensity of each pixel by merging all pixels of the category where the crop is grown in the agriculture land parcel for computing the one or more seasonal parameters, (ii) determining, using multispectral satellite band processing technique, the one or more seasonal parameters based on the category with an irrigation facility in the agriculture land parcel.

In some embodiments, the method includes determining an agricultural land area, and an estimation of sowing area of current season using the category of the one or more pixels.

In some embodiments, the method includes determining one or more seasonal parameters by, (i) obtaining a temporal profile of each pixel from the NDVI for all seasons of the year, (ii) segregating the one or more pixels based on the temporal profile into one or more crops, the temporal profile of a crop area pixel displays a pattern and the temporal profile of a non-crop area pixel does not display the pattern.

In some embodiments, the method includes determining one or more seasonal parameters by, (i) obtaining a nightlight data and population density from the one or more pixels, (ii) extracting a night light development index (NLDI) from the nightlight data, and the population density, and (iii) determining the regional prosperity index by classifying NLDI over the category of prosperity.

In some embodiments, the method includes determining one or more annual parameters based on the category of the one or more pixels by, (i) determining a peak score for each pixel by calculating a slope normalized peak NDVI value, (ii) ranking each pixel based on the peak score for each pixel using the profile of time series data for a group of pixels of the agriculture land parcel, the peak score is determined by calculating a slope normalized peak NDVI value, (iii) determining the revenue score using a yield of the crop from the NDVI value of the agriculture land parcel and a spot price for the crop.

In some embodiments, the processor is configured to determine a score based on the one or more seasonal parameters, the processor is configured to determine a agriculture land parcel report based on determined score using the one or more seasonal parameters, the agriculture land parcel report includes at least one of location details, regional metrics, crop metrics, agriculture land parcel metrics, location of the agriculture land parcel with geotagged boundary, annual rainfall, groundwater condition, crop health or crop moisture chart.

In one aspect, there is provided one or more non-transitory computer-readable storage mediums storing one or more sequences of instructions, which when executed by one or more processors, causes a method for assessing categorized pixels of one or more satellite images associated with a agriculture land parcel based on satellite data using an artificial intelligence (AI) model. The method includes obtaining one or more satellite images associated with the agriculture land parcel from one or more satellites. In some embodiments, the one or more satellite images includes a first set of satellite images that are captured in a first set of spectral bands by a first satellite, a second set of satellite images that are captured in a second set of spectral bands by a second satellite and a third set of satellite images that are captured in a third set of spectral bands by a third satellite. The method includes, pre-processing the one or more satellite images associated with the agriculture land parcel to generate a pre-processed one or more satellite images using an image pre-processing technique. In some embodiments, the pre-processed one or more satellite images includes satellite data. In some embodiments, the satellite data includes at least one of a normalized difference vegetation index (NDVI), a normalized difference water index (NDWI), a land surface temperature (LST), a modified a normalized difference water index (MNDWI), or a land surface water index (LSWI). The method includes training the AI model by categorizing a historical plurality of pixels from a historical plurality of satellite images based on a historical satellite data and correlating a historical scores with a historical categorized pixels to obtain a trained AI model. The method includes classifying, using an image segmentation technique, the one or more pixels of the pre-processed one or more satellite images into crop area-pixels that have a crop and non-crop area pixels that do not have the crop by determining a profile of time series data that corresponds to at least one of a normalized difference vegetation index (NDVI), a normalized difference water index (NDWI), a land surface temperature (LST), a modified normalized difference water index (MNDWI), or a land surface water index (LSWI) of at least one pixel of the pre-processed one or more satellite images. The method includes determining, using the trained AI model, the categorized pixels based on classification of the one or more pixels, the categorized pixels include at least one of the crop area pixels or the non-crop area pixels for the at least one season. The method includes assessing, using the trained AI model, the categorized pixels of the one or more satellite images associated with the agriculture land parcel with a score based on the satellite data.

In another aspect, a system for assessing categorized pixels of one or more satellite images associated with a agriculture land parcel based on satellite data using an artificial intelligence (AI) model is provided. The system includes a memory that stores a database and a set of instructions and a processor that is configured to execute the set of instructions and is configured to (i) obtain one or more satellite images associated with the agriculture land parcel from one or more satellites, the one or more satellite images includes a first set of satellite images that are captured in a first set of spectral bands by a first satellite, a second set of satellite images that are captured in a second set of spectral bands by a second satellite and a third set of satellite images that are captured in a third set of spectral bands by a third satellite, (ii) pre-process the one or more satellite images associated with the agriculture land parcel to generate a pre-processed one or more satellite images using an image pre-processing technique, the pre-processed one or more satellite images includes satellite data, the satellite data includes at least one of a normalized difference vegetation index (NDVI), a normalized difference water index (NDWI), a land surface temperature (LST), a modified a normalized difference water index (MNDWI), or a land surface water index (LSWI), (iii) train the AI model by categorizing a historical plurality of pixels from a historical plurality of satellite images based on a historical satellite data and correlating a historical scores with a historical categorized pixels to obtain a trained AI model, (iv) classify, using an image segmentation technique, the one or more pixels of the pre-processed one or more satellite images into crop area-pixels that have a crop and non-crop area pixels that do not have the crop by determining a profile of time series data that corresponds to at least one of a normalized difference vegetation index (NDVI), a normalized difference water index (NDWI), a land surface temperature (LST), a modified normalized difference water index (MNDWI), or a land surface water index (LSWI) of at least one pixel of the pre-processed one or more satellite images, (v) determine, using the trained AI model, the categorized pixels based on classification of the one or more pixels, the categorized pixels include at least one of the crop area pixels or the non-crop area pixels for the at least one season, and (vi) assess, using the trained AI model, the categorized pixels of the one or more satellite images associated with the agriculture land parcel with a score based on the satellite data.

In some embodiments, the processor is configured to pre-process one or more images to obtain a pre-processed one or more images by, (i) obtaining atmospherically corrected first set of images and atmospherically corrected second set of images by applying atmospheric corrections to remove effects of atmosphere on the first set of images and the second set of images, (ii) adjusting a band adjusted first set of satellite images according to a band of the second set of images using surface properties of the agriculture land parcel based on land co-ordinates of the atmospherically corrected first set of images and the atmospherically corrected second set of images, (iii) marking at least one cloudy and shadow pixels in the cloudy image of the first set of images to obtain a marked cloudy image, (iv) generating a reconstructed image from the marked cloudy image of the first set of images by replacing the at least one cloudy and shadow pixels in the third set of images, and (v) determining, using the image processing technique, the satellite data from the reconstructed image of the agriculture land parcel.

In some embodiments, the satellite data includes at least one of a normalized difference vegetation index (NDVI), a normalized difference water index (NDWI), a land surface temperature (LST), a modified a normalized difference water index (MNDWI), or a land surface water index (LSWI).

In some embodiments, the processor is configured to determine one or more seasonal parameters based on the category of one or more pixels by, (i) determining an intensity of each pixel by merging all pixels of the category where the crop is grown in the agriculture land parcel for computing the one or more seasonal parameters, (ii) determining, using multi-spectral satellite band processing technique, the one or more seasonal parameters based on the category with an irrigation facility in the agriculture land parcel.

In some embodiments, the processor is configured to determine an agricultural land area, and an estimation of sowing area of current season using the category of the one or more pixels.

In some embodiments, the processor is configured to determine one or more seasonal parameters by, (i) obtaining a temporal profile of each pixel from the NDVI for all seasons of the year, (ii) segregating the one or more pixels based on the temporal profile into one or more crops, the temporal profile of a crop area pixel displays a pattern and the temporal profile of a non-crop area pixel does not display the pattern.

In some embodiments, the processor is configured to determine one or more seasonal parameters by, (i) obtaining a nightlight data and population density from the one or more pixels, (ii) extracting a night light development index (NLDI) from the nightlight data, and the population density, and (iii) determining the regional prosperity index by classifying NLDI over the category of prosperity.

In some embodiments, the processor is configured to determine one or more annual parameters based on the category of the one or more pixels by, (i) determining a peak score for each pixel by calculating a slope normalized peak NDVI value, (ii) ranking each pixel based on the peak score for each pixel using the profile of time series data for a group of pixels of the agriculture land parcel, the peak score is determined by calculating a slope normalized peak NDVI value, (iii) determining the revenue score using a yield of the crop from the NDVI value of the agriculture land parcel and a spot price for the crop.

In some embodiments, the processor is configured to determine a score based on the one or more seasonal parameters, the processor is configured to determine a agriculture land parcel report based on determined score using the one or more seasonal parameters, the agriculture land parcel report includes at least one of location details, regional metrics, crop metrics, agriculture land parcel metrics, location of the agriculture land parcel with geotagged boundary, annual rainfall, groundwater condition, crop health or crop moisture chart.

BRIEF DESCRIPTION OF DRAWINGS

The embodiments herein will be better understood from the following detailed description with reference to the drawings, in which.

DETAILED DESCRIPTION

Figure 1:
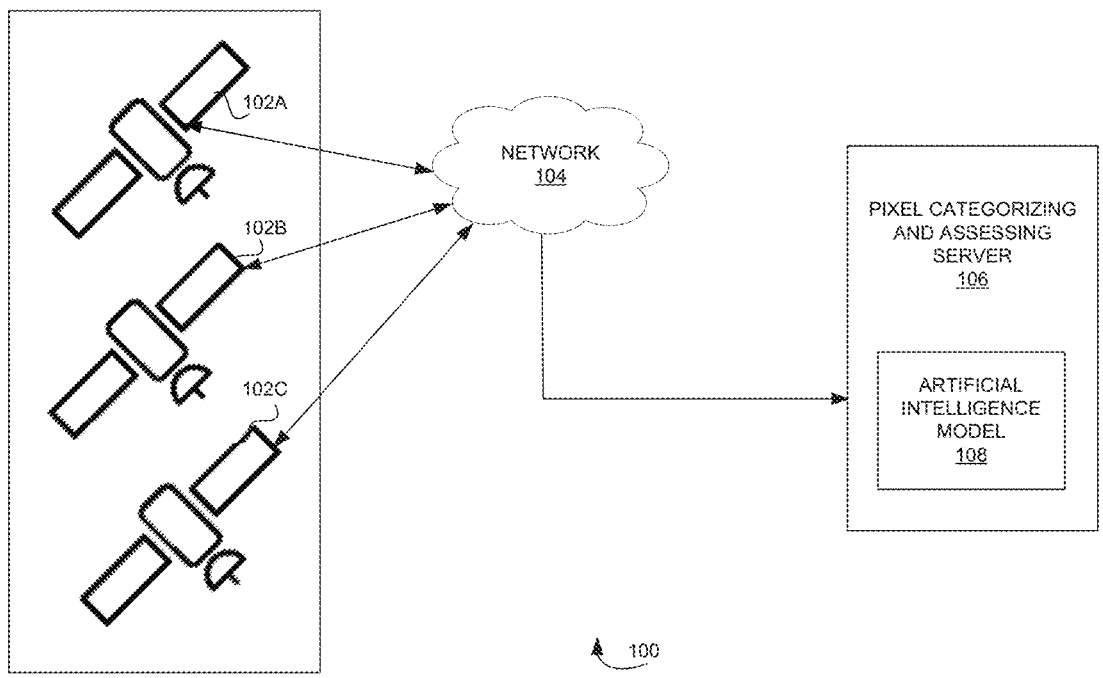
FIG. 1 illustrates a system for assessing categorized pixels of satellite images associated with an agriculture land parcel using an artificial intelligence (AI) model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be constructed as limiting the scope of the embodiments herein.

As mentioned, there remains a need for a system and method for categorizing pixels of satellite images associated with a agriculture land parcel using the AI model. The categorization of pixels is used for determining a score to assess the agriculture land parcel using the AI model. Referring now to the drawings, and more particularly to FIGS. 1 through 7, where similar reference characters denote corresponding features consistently throughout the figures, and various embodiments are shown.

The following terms are referred to in the description, which is briefly described below:

Sentinel-2 satellites survey every 10 days around the earth and collect high-resolution images of land surfaces of the earth, large islands, and inland and coastal waters. A multispectral instrument (MSI) imager of Sentinel-2 captures images in 13 spectral bands. To achieve frequent revisits and high mission availability, two identical Sentinel-2 satellites (Sentinel-2A and Sentinel-2B) operate together. The satellites are phased 180 degrees from each other on the same orbit. This allows for what would be a 10-day revisit cycle to be completed in 5 days.

Sentinel-1 satellites survey every 12 days around the earth and carry a C-band synthetic-aperture radar (SAR) instrument which provides a collection of optical data in all-weather, day, or night. To achieve frequent revisits and high mission availability, two identical Sentinel-1 satellites (Sentinel-1A and Sentinel-1B) operate together. The satellites are phased 180 degrees from each other in the same orbit. This allows for what would be a 12-day revisit cycle to be completed in 6-7 days.

Landsat-8 satellites survey every 16 days around the earth and collect multi-spectral image data affording seasonal coverage of the global landmasses. An operational land imager of Landsat-8 captures images in 11 spectral bands.

Advanced microwave scanning radiometer (AMSR2)—The Advanced Microwave Scanning Radiometer 2 (AMSR2) instrument launched aboard the Japanese Space Exploration Agency Global Change Observation Mission 1st-Water, "SHIZUKU" (GCOM-W1) satellite on May 18, 2012. AMSR2 provides data on global precipitation, ocean wind speed, water vapor, sea ice concentration, brightness temperature, and soil moisture.

SAR-Synthetic-aperture radar is a form of radar that is used to create two-dimensional images or three-dimensional reconstructions of objects, such as landscapes.

NIR (Near Infrared)—Near-infrared spectroscopy is a spectroscopic method that uses the near-infrared region of the electromagnetic spectrum.

SWIR (Short Wave InfraRed)—is a subset of the infrared band in the electromagnetic spectrum, covering the wavelengths ranging from 1.4 to 3 microns.

RGB (Red Green Blue)—An RGB image, sometimes referred to as a true-color image.

Agriculture land parcel—An agricultural land parcel includes any land parcel that is used for agricultural purposes like a farm, a group of farms, agricultural farms of a place like a village, or a mandal, or a district etc.

FIG. 1 illustrates a system 100 for assessing categorized pixels of satellite images associated with an agriculture land parcel using an artificial intelligence (AI) model 108 according to some embodiments herein. The system 100 includes one or more satellites 102A, 102B, and 102C, and a pixel categorizing and assessing server 106 that includes the AI model 108. The pixel categorizing and assessing server 106 includes a device processor and a non-transitory computer-readable storage medium storing one or more sequences of instructions, which when executed by the device processor causes the processing of one or more satellite images for pixel categorization. The pixel categorizing and assessing server 106 receives a first set of images, a second set of images and a third set of images from one or more satellites 102A, 102B, and 102C through a network 104. The network 104 may include, but is not limited to, a wireless network, a wired network, a combination of the wired network and the wireless network or Internet, and the like.

The first set of images may be from Sentinel-2 satellite 102A. The second set of images may be from a Landsat-8 satellite 102B. The third set of images may be from AMSR2 satellite 102C. The one or more satellites 102A, 102B, and 102C may record the first set of images associated with a first set of spectral bands, the second set of images associated with a second set of spectral bands, and the third set of images associated with a third set of spectral bands. The pixel categorizing and assessing server 106 selects at least one of the first set of spectral bands, the second set of spectral bands, or the third set of spectral bands. The first set of spectral bands, the second set of spectral bands, and the third set of spectral bands may include SAR (Synthetic Aperture Radar), NIR (Near Infrared), SWIR (Short Wave InfraRed), and RGB (Red Green Blue) bands.

The pixel categorizing and assessing server 106 pre-processes one or more satellite images associated with the agriculture land parcel to generate pre-processed satellite images. The pre-processed satellite images include satellite data. The satellite data include at least one of a normalized difference vegetation index (NDVI), a normalized difference water index (NDWI), a land surface temperature (LST), a modified a normalized difference water index (MNDWI), or a land surface water index (LSWI).

The pixel categorizing and assessing server 106 trains the AI model 108 by categorizing a historical plurality of pixels from a historical plurality of satellite images based on a historical satellite data and correlating a historical scores with a historical categorized pixels to obtain a trained AI model. The pixel categorizing and assessing server 106 classifies one or more pixels of the pre-processed satellite images into crop area pixels that have a crop and non-crop area pixels that do not have the crop by determining a profile of time series data using an image segmentation technique. The pixel categorizing and assessing server 106 determines the profile of time series data that corresponds to at least one of a normalized difference vegetation index (NDVI), a normalized difference water index (NDWI), a land surface temperature (LST), a modified a normalized difference water index (MNDWI), or a land surface water index (LSWI) of at least one pixel of the pre-processed satellite images.

The pixel categorizing and assessing server 106 determines categorized pixels based on the classification of the one or more pixels using the trained AI model. The categorized pixels include at least one of the crop area pixels or the non-crop area pixels for the at least one season. The pixel categorizing and assessing server 106 assesses the categorized pixels of the one or more satellite images associated with the agriculture land parcel with a score using the trained AI model.

In some embodiments, the pixel categorizing and assessing server 106 determines an agriculture land parcel report based on the determined score using one or more seasonal parameters and one or more annual parameters. In some embodiments, the agriculture land parcel report includes at least one of location details, regional metrics, crop metrics, agriculture land parcel metrics, location of the agriculture land parcel with geotagged boundary, annual rainfall, groundwater condition, crop health, or crop moisture chart.

Figure 2:
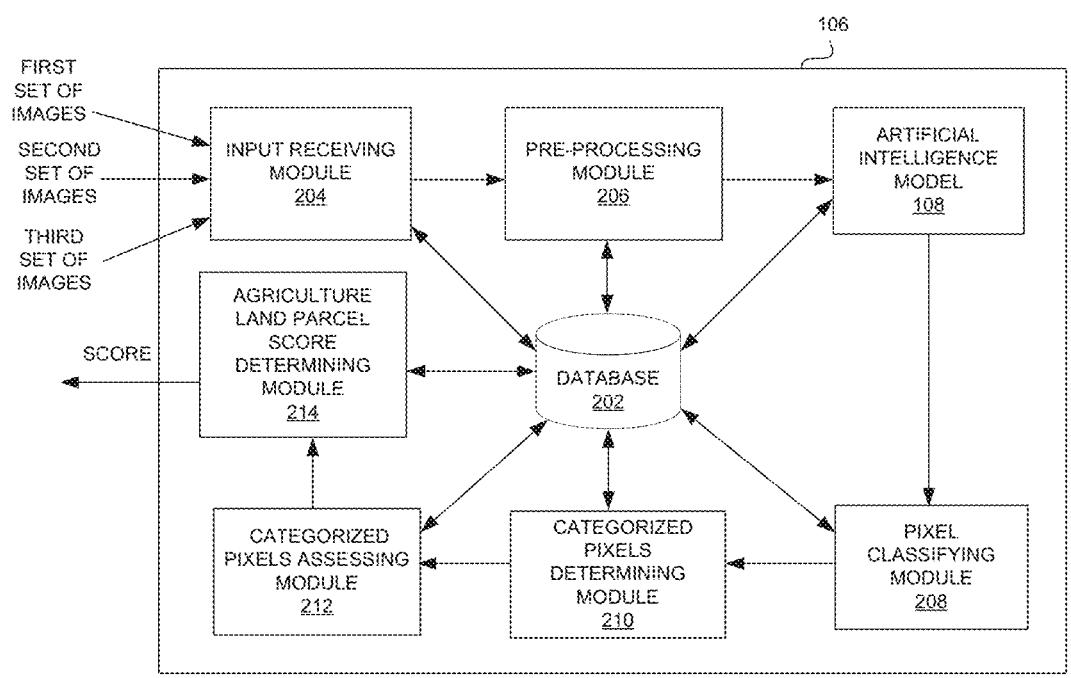
FIG. 2 illustrates a block diagram of a pixel categorizing and assessing and assessing server of FIG. 1 according to some embodiments herein.

FIG. 2 illustrates a block diagram of a pixel categorizing and assessing server 106 according to some embodiments herein. The block diagram of the pixel categorizing and assessing server 106 includes a database 202, an input receiving module 204, a pre-processing module 206, an artificial intelligence (AI) model 108, a pixel classifying module 208, a categorized pixels determining module 210, a categorized pixels assessing module 212, and an agriculture land parcel score determining module 214. The input receiving module 204 receives a first set of images, a second set of images and a third set of images from one or more satellites 102A, 102B, and 102C. The one or more satellites 102A, 102B, and 102C may record the first set of images associated with a first set of spectral bands, the second set of images associated with a second set of spectral bands, and the third set of images associated with a third set of spectral bands The first set of images, the second set of images, and the third set of images are stored in the database 202. The pre-processing module 206 pre-processes one or more satellite images associated with the agriculture land parcel to generate pre-processed satellite images. The pre-processed satellite images include satellite data. The satellite data include at least one of a normalized difference vegetation index (NDVI), a normalized difference water index (NDWI), a land surface temperature (LST), a modified a normalized difference water index (MNDWI), or a land surface water index (LSWI).

The AI model 108 is trained by categorizing a historical plurality of pixels from a historical plurality of satellite images based on a historical satellite data and correlating a historical scores with a historical categorized pixels to obtain a trained AI model.

The pixel classifying module 208 classifies one or more pixels of the pre-processed satellite images into crop area pixels that have a crop and non-crop area pixels that do not have the crop by determining a profile of time series data using an image segmentation technique. The pixel classifying module 208 determines the profile of time series data that corresponds to at least one of a normalized difference vegetation index (NDVI), a normalized difference water index (NDWI), a land surface temperature (LST), a modified a normalized difference water index (MNDWI), or a land surface water index (LSWI) of at least one pixel of the pre-processed satellite images.

The categorized pixels determining module 210 determines the categorized pixels based on the classification of the one or more pixels using the trained AI model. The categorized pixels include at least one of the crop area pixels or the non-crop area pixels for the at least one season. The categorized pixels assessing module 212 assesses the categorized pixels of the one or more satellite images associated with the agriculture land parcel with a score using the trained AI model.

The agriculture land parcel score determining module 214 determines a score based on the category for the crop area pixels and the non-crop area pixels for the at least one season. The score is determined by aggregating a seasonal score and an annual score of the agriculture land parcel. The seasonal score is determined by aggregating seasonal parameters based on the category of the crop area pixels and the non-crop area pixels. The annual score is determined by aggregating annual parameters based on the category of the crop area pixels and the non-crop area pixels. The seasonal parameters are determined by (i) obtaining a temporal profile of each pixel from the NDVI for all seasons of the year, (ii) segregating one or more pixels based on the temporal profile into one or more crops, and the temporal profile of a crop area pixel displays a pattern and the temporal profile of a non-crop area pixel does not display the pattern, (iii) obtaining nightlight data and population density from one or more pixels, (iv) extracting a night light development index (NLDI) from the nightlight data and the population density, (v) determining the regional prosperity index by classifying NLDI over the category of prosperity. The annual parameters are determined by, (i) determining a peak score for each pixel by calculating a slope normalized peak NDVI value, (ii) ranking each pixel based on the peak score for each pixel using the profile of time series data for a group of pixels of the agriculture land parcel, the peak score is determined by calculating a slope normalized peak NDVI value, (iii) determining the revenue score using a yield of the crop from the NDVI value of the agriculture land parcel and a spot price for the crop.

Figure 3:
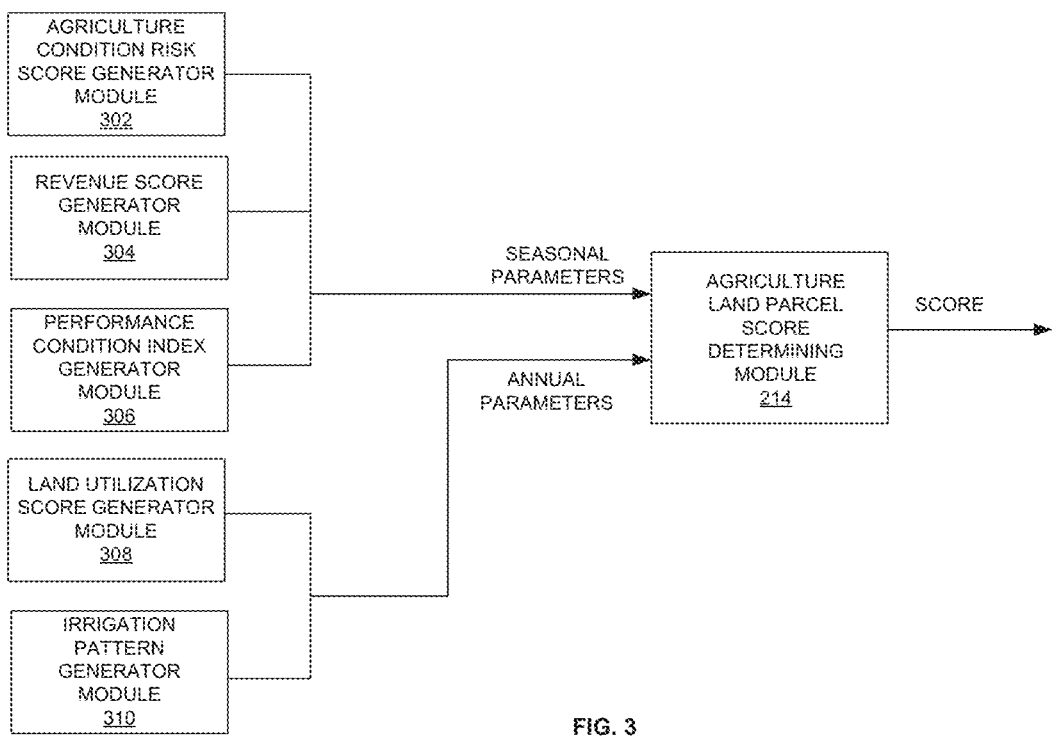
FIG. 3 illustrates a block diagram of an agriculture land parcel score determining module of FIG. 2 according to some embodiments herein.

FIG. 3 illustrates a block diagram of an agriculture land parcel score determining module 214 of FIG. 2 according to some embodiments herein. The block diagram of the agriculture land parcel score determining module 214 includes an agriculture condition risk score generator module 302, a revenue score generator module 304, a performance condition index generator module 306, a land utilization index generator module 308, and an irrigation pattern generator module 310. The agriculture condition risk score generator module 302 generates an agriculture condition risk score. The agriculture condition risk score is determined by a peak score for a normalized difference vegetation index (NDVI) value for each pixel. The peak score is determined by calculating a slope of normalized peak NDVI value. The revenue score generator module 304 generates a revenue score using the yield of the crop from the NDVI value of the agriculture land parcel and a spot price for the crop. The revenue score is used as a comparison index between different crops. The performance condition index generator module 306 generates a performance condition index by a ranking of each pixel using the peak score values when compared across a historical data of the agricultural condition risk score. The land utilization index generator module 308 generates a land utilization index. The land utilization index is determined by merging all pixels where the crop is grown in the agriculture land parcel for all seasons of the year by computing a crop intensity of each pixel for all seasons of the year. The irrigation pattern score generator module 310 generates an irrigation pattern score by selecting the NDVI of the agriculture land parcel by applying a land surface temperature (LST) on a combined index. The agriculture land parcel score determining module 214 obtains seasonal parameters and annual parameters.

In some embodiments, the one or more seasonal parameters include a regional prosperity index that is determined by, (i) obtaining a nightlight data and population density from the one or more pixels, (ii) extracting a night light development index (NLDI) from the nightlight data, and the population density, and (iii) determining the regional prosperity index by classifying NLDI over the category of prosperity. In some embodiments, the one or more seasonal parameters include an agricultural land area and an estimation of the sowing area of the current season that is determined using the category of the one or more pixels.

In some embodiments, an irrigation facility in the agriculture land parcel is determined based on the category of one or more pixels by, (i) determining an intensity of each pixel by merging all pixels of the category where the crop is grown in the agriculture land parcel for computing the one or more seasonal parameters, (ii) determining, using multispectral satellite band processing technique, the one or more seasonal parameters based on the category with the irrigation facility in the agriculture land parcel.

In some embodiments, the one or more seasonal parameters are determined by, (i) obtaining a temporal profile of each pixel from the NDVI for all seasons of the year, (ii) segregating the one or more pixels based on the temporal profile into one or more crops, the temporal profile of a crop area pixel displays a pattern and the temporal profile of a non-crop area pixel does not display the pattern.

The agriculture land parcel score determining module 214 determines a score based on the category for the crop area pixels and the non-crop area pixels for the at least one season. The score is determined by aggregating a seasonal score and an annual score of the agriculture land parcel. The seasonal score is determined by aggregating one or more seasonal parameters based on the category of the crop area pixels and the non-crop area pixels. The annual score is determined by aggregating one or more annual parameters based on the category of the crop area pixels and the non-crop area pixels.

Figure 4:
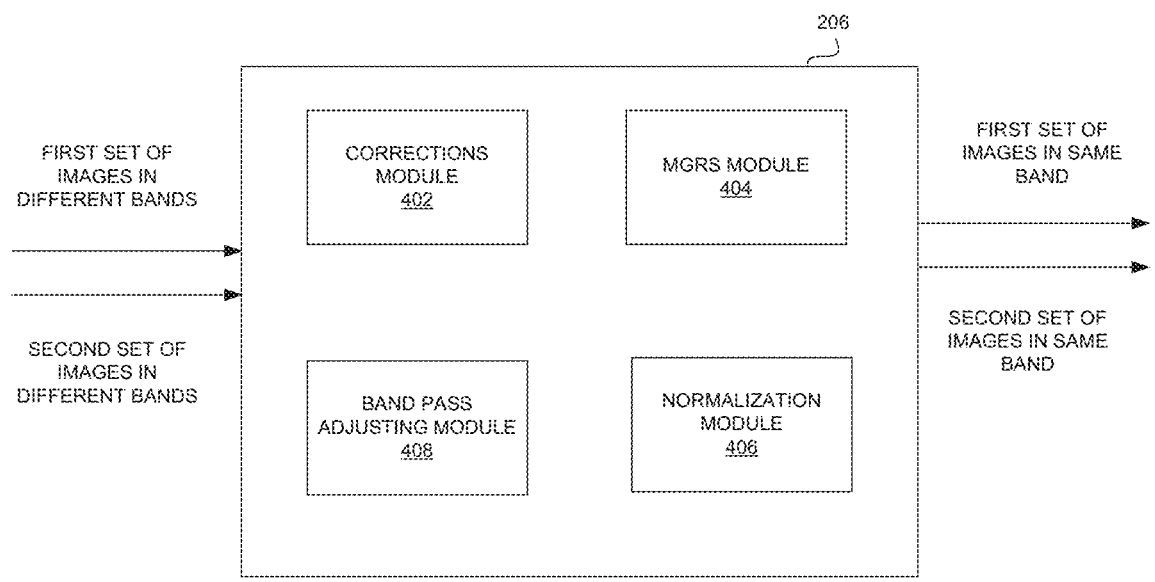
FIG. 4 illustrates a block diagram of a pre-processing module of FIG. 2 for pre-processing the satellite images according to some embodiments herein.

FIG. 4 illustrates a block diagram of a pre-processing module 206 of FIG. 2 for pre-processing the satellite images according to some embodiments herein. The block diagram of the pre-processing module 206 includes an atmospheric corrections module 402, an MGRS module 404, a normalization module 406, a bandpass adjusting module 408. The pre-processing module 206 pre-processes the first set of satellite images and the second set of images in one or more spectral bands. The atmospheric corrections module 402 applies atmospheric corrections to remove the effects of the atmosphere on the first set of images and the second set of images. The effects of the atmosphere may be shadows, or clouds, etc. The MGRS module 404 resamples the atmospherically corrected first set of images and second set of images. The MGRS module 404 may locate land co-ordinates of a desired place on the earth using a tiling system. The tiling system may be a military grid reference system. In some embodiments, the tiling system may be applied to a resolution of 30 meters. The normalization module 406 obtains surface properties in one or more spectral bands of the desired place based on located points on the earth, using a normalization technique. The normalization technique may be a bidirectional reflectance distribution function. The surface properties are obtained may be at a resolution of 500 meters. The bandpass adjusting module 408 adjusts the one or more spectral bands of the first set of images according to the one or more spectral bands of the second set of images. The multi-spectral instrument (MSI) imager of Sentinel-2 captures the first set of images in 13 spectral bands. The operational land imager (OLI) of Landsat-8 captures the second set of images in 11 spectral bands. The bandpass adjusting module 408 derives a bandpass adjusted dataset of the first set of images and a dataset of the second set of images with NBAR (Nadir bidirectional reflectance distribution function Adjusted Reflectance) corrected surface reflectance at a resolution of 30 meters. The bandpass adjusted dataset of the first set of images may be an S30 dataset and the dataset of the second set of images may be an L30 dataset.

The pre-processing module 206 marks at least one cloudy and shadow pixel in the cloudy image of the first set of images to obtain a marked cloudy image. The pre-processing module 206 generates a reconstructed image from the marked cloudy image of the first set of images by replacing the at least one cloudy and shadow pixels in the third set of images. The pre-processing module 206 determines the satellite data from the reconstructed image of the agriculture land parcel using the image processing technique. The satellite data includes at least one of a normalized difference vegetation index (NDVI), a normalized difference water index (NDWI), a land surface temperature (LST), a modified a normalized difference water index (MNDWI), or a land surface water index (LSWI) of at least one pixel of the pre-processed satellite images.

In some embodiments, a wavelength of NIR ranges from 726.8 micrometers to 938.8 nanometers for the first set of images, a wavelength of SAR ranges from 1.1 centimeters to 0.8 centimeters for the first set of images, a wavelength of SWIR ranges from 1522.7 nanometers to 1704.7 nanometers for the first set of images, a wavelength of blue band ranges from 426.4 nanometers to 558.4 nanometers for the first set of images, a wavelength of green band ranges from 523.8 nanometers to 595.8 nanometers for the first set of images, a wavelength of red band ranges from 695.6 nanometers to 633.6 nanometers for the first set of images, a wavelength of NIR ranges from 0.5 micrometers to 0.68 micrometers for the second set of images, a wavelength of SAR ranges from 1.1 centimeters to 0.8 centimeters for the second set of images, a wavelength of SWIR ranges from 11.5 micrometers to 12.5 micrometers for the second set of images, a wavelength of blue band ranges from 0.45 micrometers to 0.515 micrometers for the second set of images, a wavelength of green band ranges from 0.525 micrometers to 0.6 micrometers for the second set of images, a wavelength of red band ranges from 0.630 micrometers to 0.680 micrometers for the second set of images.

Figure 5A:
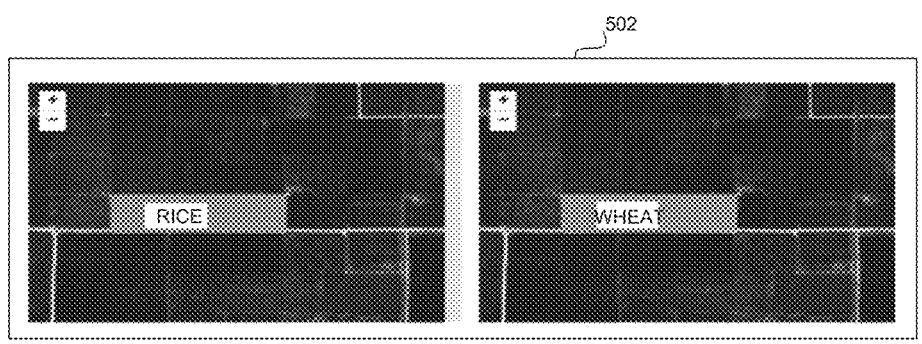
FIG. 5A illustrates an exemplary view of extracted parameters from categorized pixels of the satellite images using the AI model according to some embodiments herein.
Figure 5A:
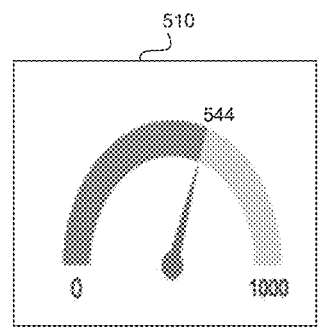

FIG. 5A illustrates an exemplary view of extracted parameters from categorized pixels of the satellite images using the AI model 108 according to some embodiments herein. The exemplary view of extracted parameters from categorized pixels of the satellite images includes categorized crop area pixels of the agriculture land parcel into different crops at 502. The cropping pixels of the agriculture land parcel includes a crop of paddy in Kharif season and another crop of wheat in rabi season. FIG. 5A also illustrates an exemplary view of a score for an agriculture land parcel from categorized pixels of the satellite images using the AI model 108 according to some embodiments herein. At 510, an exemplary score for an agriculture land parcel is shown. As depicted at 510, the exemplary score for the agriculture land parcel is 342 out of 900. The score for the agriculture land parcel ranges from 0 to 1000. Optionally, the minimum score is 0 and the maximum score is 1000. Optionally, if there is no crop in the agriculture land parcel, then the score for the agriculture land parcel is 0 ideally.

Figure 5B:
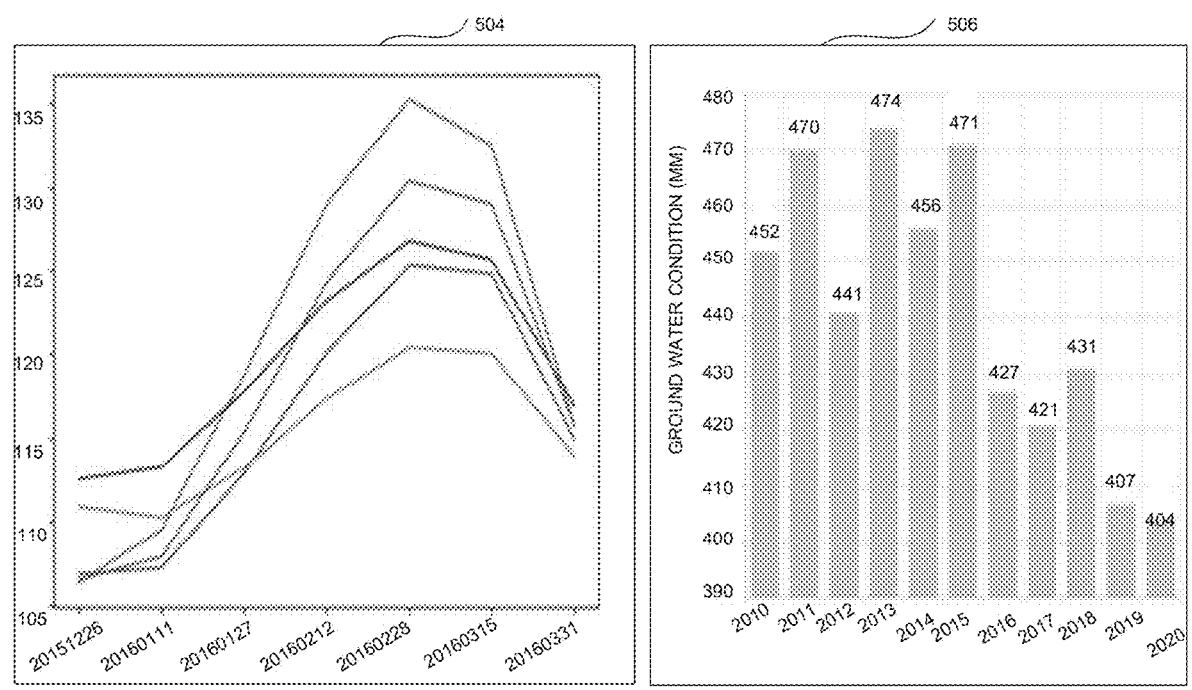
FIG. 5B illustrates an exemplary view of a profile of time series data from categorized pixels of the satellite images using the AI model 108 according to some embodiments herein.

FIG. 5B illustrates an exemplary view of a profile of time series data from categorized pixels of the satellite images using the AI model 108 according to some embodiments herein. At 504, a profile of time series data that corresponds to the satellite data of cropping pixels for different crops is shown. A pixel that includes an agricultural crop may display a signature profile that is referred to as crop phenology. The non-crop area pixels may not follow any pattern as shown at 504. At 506, a graphical representation of groundwater level every year is shown. The graphical representation at 506 depicts groundwater level on the Y-axis and time on X-axis. The graphical representation of groundwater level every year provides insights on fluctuations in the ground level water level over years which may lead to changes in the productivity of the agriculture land parcel.

Figure 5C:
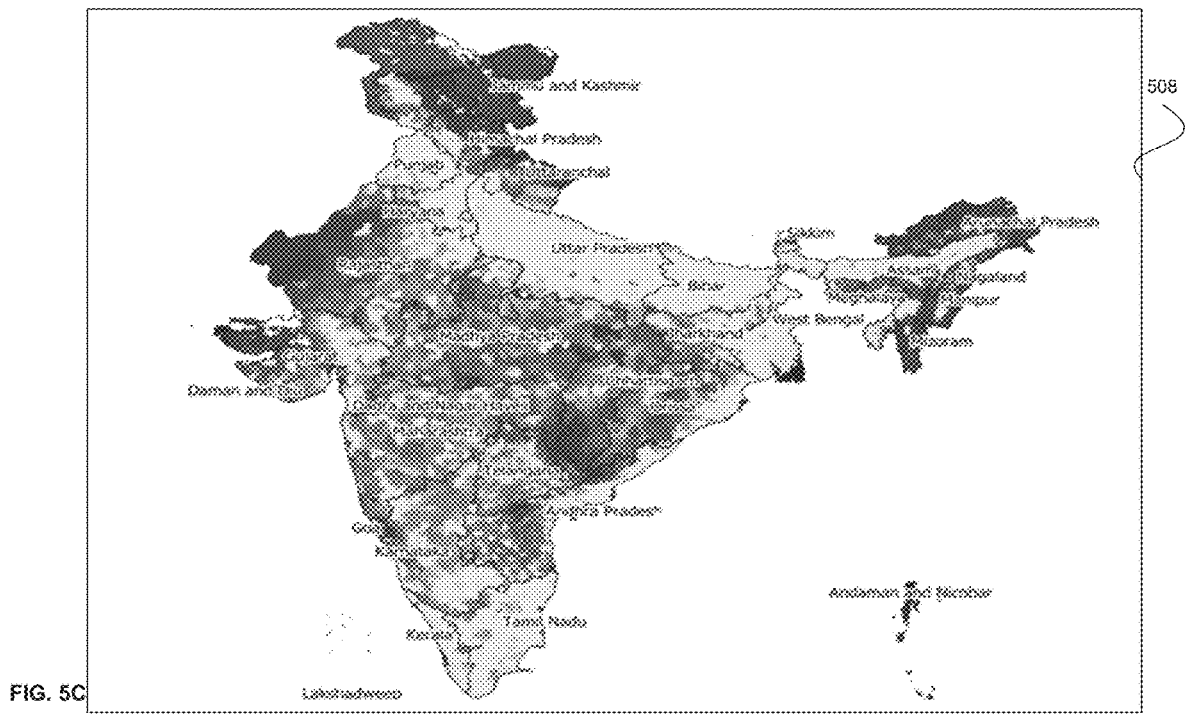
FIG. 5C illustrates an exemplary view of night light data from categorized pixels of the satellite images using the AI model 108 according to some embodiments herein.
Figure 6:
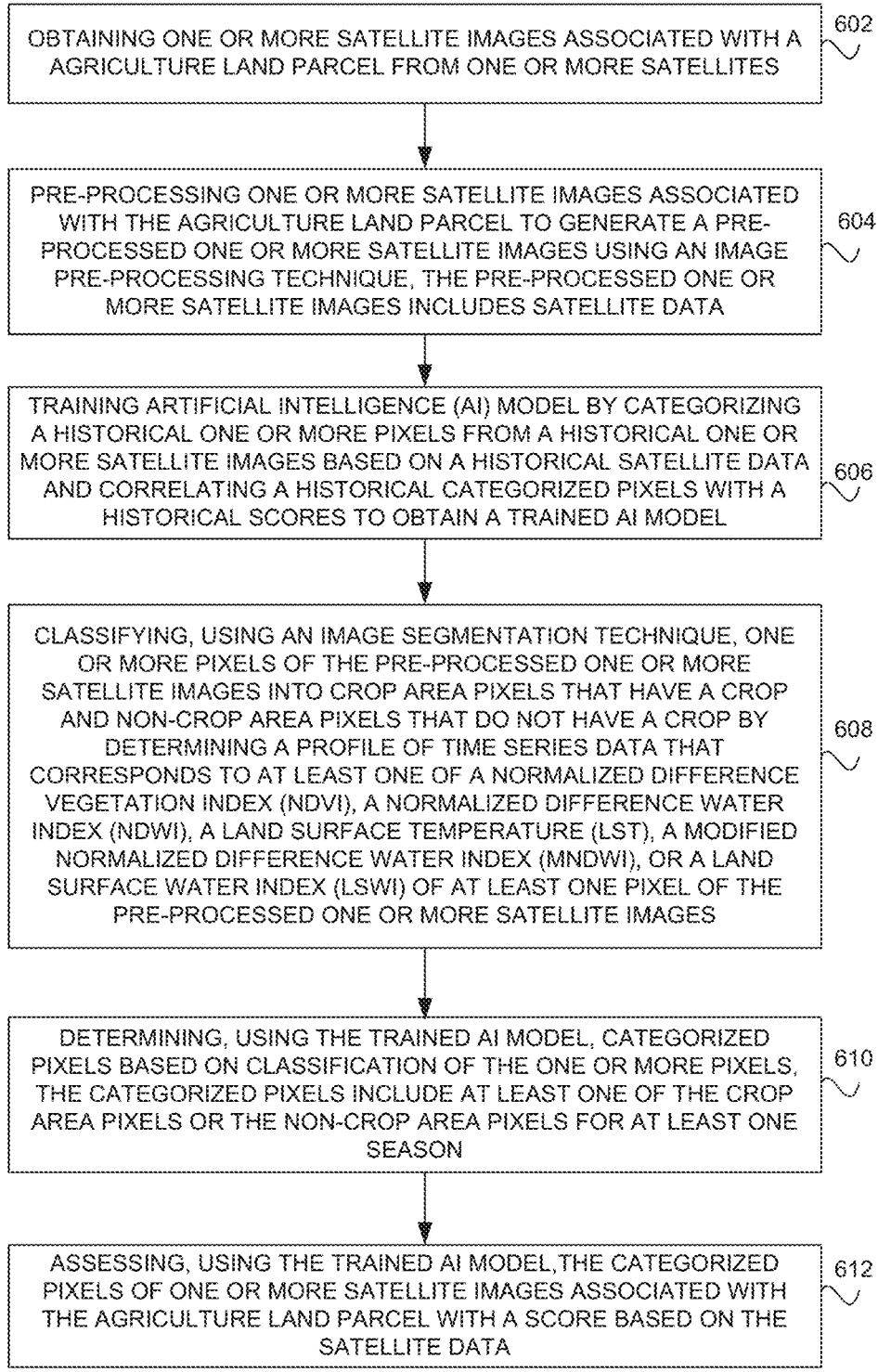
FIG. 6 is a flow diagram of a method for assessing categorized pixels of satellite images associated with an agriculture land parcel using an artificial intelligence (AI) model according to some embodiments herein.

FIG. 5C illustrates an exemplary view of night light data from categorized pixels of the satellite images using the AI model 108 according to some embodiments herein. At 508, nightlight data of a given territory, that is Indian territory is shown. The nightlight data is used as a representation of the economic development for the given territory. The nightlight data is based on the light that results from human activity which is visible from outer space at night. FIG. 6 is a flow diagram of a method for assessing categorized pixels of satellite images associated with an agriculture land parcel using an artificial intelligence (AI) model according to some embodiments herein. At a step of 602, the method includes, obtaining one or more satellite images associated with the agriculture land parcel from one or more satellites. In some embodiments, the one or more satellite images include a first set of images associated with a first set of spectral bands, a second set of images associated with a second set of spectral bands and a third set of images associated with a third set of spectral bands. At a step of 604, the method includes, pre-processing the one or more satellite images associated with the agriculture land parcel to generate a pre-processed one or more satellite images using an image pre-processing technique. In some embodiments, the pre-processed one or more satellite images includes satellite data. At a step of 606, the method includes, training the AI model by categorizing a historical plurality of pixels from a historical plurality of satellite images based on a historical satellite data and correlating a historical scores with a historical categorized pixels to obtain a trained AI model. At a step of 608, the method includes classifying, using an image segmentation technique, the one or more pixels of the pre-processed one or more satellite images into crop area-pixels that have a crop and non-crop area pixels that do not have the crop by determining a profile of time series data that corresponds to at least one of a normalized difference vegetation index (NDVI), a normalized difference water index (NDWI), a land surface temperature (LST), a modified normalized difference water index (MNDWI), or a land surface water index (LSWI) of at least one pixel of the pre-processed plurality of satellite images. At a step of 610, the method includes, determining, using the trained AI model, the categorized pixels based on classification of the one or more pixels, the categorized pixels include at least one of the crop area pixels or the non-crop area pixels for the at least one season. At a step of 612, the method includes, assessing, using the trained AI model, the categorized pixels of the one or more satellite images associated with the agriculture land parcel with a score based on the satellite data.

Figure 7:
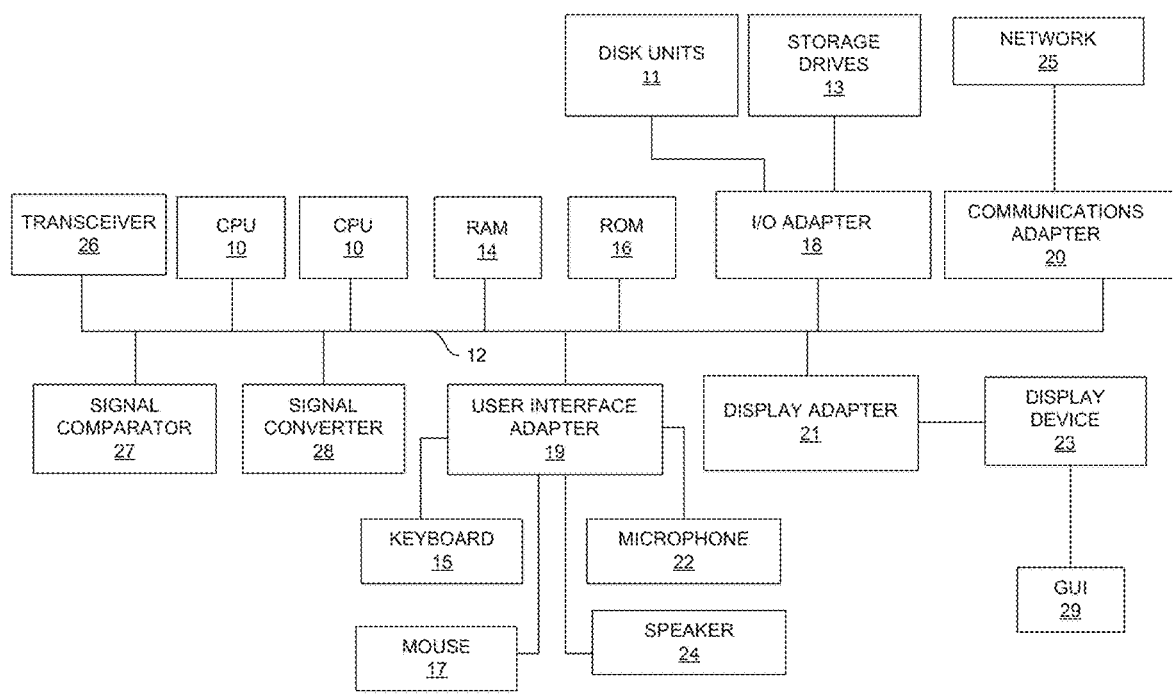
FIG. 7 is a schematic diagram of a computer architecture in accordance with embodiments herein.

A representative hardware environment for practicing the embodiments herein is depicted in FIG. 7, with reference to FIGS. 1 through 6. This schematic drawing illustrates a hardware configuration of a pixel categorizing and assessing server 106/computer system/computing device in accordance with the embodiments herein. The system includes at least one processing device CPU 10 and at least one graphical processing device GPU 38 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The system and method of categorizing pixels of satellite images associated with an agriculture land parcel using the AI model are provided. The system generates a score based on seasonal components and annual components that are derived from the categorization of pixels of the satellite images. The system generates an agriculture land parcel report based on the seasonal components and the annual components. The agriculture land parcel report includes a location of the agriculture land parcel, regional metrics like rainfall, groundwater condition, type of soil, regional prosperity index, drought instances, temperature, topography, crop metrics like major crops, crop yield, crop area, total agricultural land parcel area, spot price, the total revenue potential of agriculture land parcel, crop performance, seasonal credit score, crop health and crop moisture, agriculture land parcel metrics like agriculture land parcel area, land utilization price, irrigation condition, closest mandi, proximity to a major water body, proximity for road/rail, historical agriculture land parcel potential. The system generates the score automatically without any human interventions. Thereby, fewer resources are utilized in less time in generating the score using the system. Hence, the scalability of the system in generating the score when compared with the traditional ones is improved. As the system is easily interpretable and explainable, it is globally applicable. The system is very cost-efficient and the process efficacy is more when compared with the traditional ones. Hence, the system is used as a better risk management tool.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for assessing categorized pixels of a plurality of satellite images associated with an agriculture land parcel based on satellite data using an artificial intelligence (AI) model, the method comprising:
obtaining the plurality of satellite images associated with the agriculture land parcel from a plurality of satellites, wherein the plurality of satellite images comprises a first set of images that are captured in a first set of spectral bands by a first satellite, a second set of images that are captured in a second set of spectral bands by a second satellite and a third set of images that are captured in a third set of spectral bands by a third satellite;
pre-processing, using an image pre-processing technique, the plurality of satellite images associated with the agriculture land parcel to generate a pre-processed plurality of satellite images, wherein the pre-processed plurality of satellite images comprises satellite data;
training the AI model by categorizing a historical plurality of pixels from a historical plurality of satellite images based on a historical satellite data and correlating a historical scores with a historical categorized pixels to obtain a trained AI model;
classifying, using an image segmentation technique, a plurality of pixels of the pre-processed plurality of satellite images into crop area-pixels that have a crop and non-crop area pixels that do not have the crop by determining a profile of time series data that corresponds to at least one of a normalized difference vegetation index (NDVI), a normalized difference water index (NDWI), a land surface temperature (LST), a modified normalized difference water index (MNDWI), or a land surface water index (LSWI) of at least one pixel of the pre-processed plurality of satellite images;

determining, using the trained AI model, the categorized pixels based on classification of the plurality of pixels based on a temporal profile of each categorized pixel, wherein the categorized pixels comprise at least one of the crop area pixels or the non-crop area pixels for at least one season;

assessing, using the trained AI model, the categorized pixels of the plurality of satellite images associated with the agriculture land parcel with a score based on the satellite data; and determining the score using a plurality of seasonal parameters and a plurality of annual parameters, wherein the plurality of annual parameters are determined based on the categorized pixels by (i) determining a peak score for each pixel by calculating a slope normalized peak NDVI value, (ii) ranking each pixel based on the peak score for each pixel using the profile of time series data for a group of pixels of the agriculture land parcel, the peak score is determined by calculating a slope normalized peak NDVI value, and (iii) determining a revenue score using a yield of the crop the NDVI value of the agriculture land parcel and a spot price for the crop.

2. The processor-implemented method of claim 1, wherein the method comprises pre-processing the plurality of images to obtain a pre-processed plurality of images by:
obtaining atmospherically corrected first set of images and atmospherically corrected second set of images by applying atmospheric corrections to remove effects of atmosphere on the first set of images and the second set of images;
adjusting a band adjusted first set of satellite images according to a band of the second set of images using surface properties of the agriculture land parcel based on land co-ordinates of the atmospherically corrected first set of images and the atmospherically corrected second set of images;
marking at least one cloudy and shadow pixels in a cloudy image of the first set of images to obtain a marked cloudy image;
generating a reconstructed image from the marked cloudy image of the first set of images by replacing the at least one cloudy and shadow pixels in the third set of images; and
determining, using an image processing technique, the satellite data from the reconstructed image of the agriculture land parcel.

3. The processor-implemented method of claim 2, wherein the satellite data comprises the at least one of the normalized difference vegetation index (NDVI), the normalized difference water index (NDWI), the land surface temperature (LST), the modified a normalized difference water index (MNDWI), or the land surface water index (LSWI).

4. The processor-implemented method of claim 1, wherein the method further comprises determining the plurality of seasonal parameters based on a category of the plurality of pixels by:
determining an intensity of each pixel by merging all pixels of the category where the crop is grown in the agriculture land parcel for computing the plurality of seasonal parameters; and determining, using a multi-spectral satellite band processing technique, the plurality of seasonal parameters based on the category with an irrigation facility in the agriculture land parcel.

5. The processor-implemented method of claim 4, the method comprises determining an agricultural land area, and an estimation of sowing area of current season using the category of the plurality of pixels.

6. The processor-implemented method of claim 1, the method further comprises determining the plurality of seasonal parameters by:
obtaining the temporal profile of each pixel from the NDVI for all seasons of a year; and
segregating the plurality of pixels based on the temporal profile into a plurality of crops, wherein the temporal profile of a crop area pixel displays a pattern, and the temporal profile of a non-crop area pixel does not display the pattern.

7. The processor-implemented method of claim 4, wherein the processor is configured to determine a agriculture land parcel report based on the score using the plurality of seasonal parameters, wherein the agriculture land parcel report comprises at least one of location details, regional metrics, crop metrics, agriculture land parcel metrics, location of the agriculture land parcel with geotagged boundary, annual rainfall, groundwater condition, crop health or crop moisture chart.

8. One or more non-transitory computer-readable storage mediums storing one or more sequences of instructions, which when executed by one or more processors, causes a method for assessing categorized pixels of a plurality of satellite images associated with an agriculture land parcel based on satellite data using an artificial intelligence (AI) model performing steps of:
obtaining the plurality of satellite images associated with the agriculture land parcel from a plurality of satellites, wherein the plurality of satellite images comprises a first set of images that are captured in a first set of spectral bands by a first satellite, a second set of images that are captured in a second set of spectral bands by a second satellite and a third set of images that are captured in a third set of spectral bands by a third satellite;
pre-processing, using an image pre-processing technique, the plurality of satellite images associated with the agriculture land parcel to generate a pre-processed plurality of satellite images, wherein the pre-processed plurality of satellite images comprises satellite data;
training the AI model by categorizing a historical plurality of pixels from a historical plurality of satellite images based on a historical satellite data and correlating a historical scores with a historical categorized pixels to obtain a trained AI model;
classifying, using an image segmentation technique, a plurality of pixels of the pre-processed plurality of satellite images into crop area-pixels that have a crop and non-crop area pixels that do not have the crop by determining a profile of time series data that corresponds to at least one of a normalized difference vegetation index (NDVI), a normalized difference water index (NDWI), a land surface temperature (LST), a modified normalized difference water index (MNDWI), or a land surface water index (LSWI) of at least one pixel of the pre-processed plurality of satellite images;
determining, using the trained AI model, the categorized pixels based on classification of the plurality of pixels based on a temporal profile of each categorized pixel, wherein the categorized pixels comprise at least one of the crop area pixels or the non-crop area pixels for at least one season;

assessing, using the trained AI model, the categorized pixels of the plurality of satellite images associated with the agriculture land parcel with a score based on the satellite data; and determining the score using a plurality of seasonal parameters and a plurality of annual parameters, wherein the plurality of annual parameters are determined based on the categorized pixels by (i) determining a peak score for each pixel by calculating a slope normalized peak NDVI value, (ii) ranking each pixel based on the peak score for each pixel using the profile of time series data for a group of pixels of the agriculture land parcel, the peak score is determined by calculating a slope normalized peak NDVI value, and (iii) determining a revenue score using a yield of the crop the NDVI value of the agriculture land parcel and a spot price for the crop.

9. A system for assessing categorized pixels of a plurality of satellite images associated with an agriculture land parcel based on satellite data using an artificial intelligence (AI) model, wherein the system comprises:

a server that receives a plurality of satellite images of the agriculture land parcel that are obtained from a plurality of satellites, wherein the plurality of satellite images comprises a first set of images that are captured in a first set of spectral bands by a first satellite, a second set of images that are captured in a second set of spectral bands by a second satellite and a third set of images that are captured in a third set of spectral bands by a third satellite, wherein the server comprises, a memory that stores a database and a set of modules;

a processor in communication with the memory, the processor retrieving executing machine-readable program instructions from the memory which, when executed by the processor, enable the processor to:

pre-process, using an image pre-processing technique, the plurality of satellite images associated with the agriculture land parcel to generate a pre-processed plurality of satellite images, wherein the pre-processed plurality of satellite images comprises satellite data;

train the AI model by categorizing a historical plurality of pixels from a historical plurality of satellite images based on a historical satellite data and correlating a historical scores with a historical categorized pixels to obtain a trained AI model;

classify, using an image segmentation technique, the plurality of pixels of the pre-processed plurality of satellite images into crop area-pixels that have a crop and non-crop area pixels that do not have the crop by determining a profile of time series data that corresponds to at least one of a normalized difference vegetation index (NDVI), a normalized difference water index (NDWI), a land surface temperature (LST), a modified a normalized difference water index (MNDWI), or a land surface water index (LSWI) of at least one pixel of the pre-processed plurality of satellite images;

determine, using the trained AI model, the categorized pixels based on classification of the one or more pixels based on a temporal profile of each categorized pixel, wherein the categorized pixels comprise at least one of the crop area pixels or the non-crop area pixels for at least one season;

assess, using the trained AI model, the categorized pixels of the plurality of satellite images associated with the agriculture land parcel with a score based on the satellite data; and determine the score using a plurality of seasonal parameters and a plurality of annual parameters, wherein the plurality of annual parameters are determined based on the categorized pixels by (i) determining a peak score for each pixel by calculating a slope normalized peak NDVI value, (ii) ranking each pixel based on the peak score for each pixel using the profile of time series data for a group of pixels of the agriculture land parcel, the peak score is determined by calculating a slope normalized peak NDVI value, and (iii) determining a revenue score using a yield of the crop the NDVI value of the agriculture land parcel and a spot price for the crop.

10. The system of claim 9, wherein the processor is configured to pre-process the plurality of images to obtain a pre-processed plurality of images by:

obtaining atmospherically corrected first set of images and atmospherically corrected second set of images by applying atmospheric corrections to remove effects of atmosphere on the first set of images and the second set of images;

adjusting a band adjusted first set of satellite images according to a band of the second set of images using surface properties of the agriculture land parcel based on land co-ordinates of the atmospherically corrected first set of images and the atmospherically corrected second set of images;

marking at least one cloudy and shadow pixels in a cloudy image of the first set of images to obtain a marked cloudy image;

generating a reconstructed image from the marked cloudy image of the first set of images by replacing the at least one cloudy and shadow pixels in the third set of images; and determining, using an image processing technique, the satellite data from the reconstructed image of the agriculture land parcel.

11. The system of claim 10, wherein the satellite data comprises the at least one of the normalized difference vegetation index (NDVI), the normalized difference water index (NDWI), the land surface temperature (LST), the modified a normalized difference water index (MNDWI), or the land surface water index (LSWI).

12. The system of claim 9, wherein the processor is configured to determine the plurality of seasonal parameters based on a category of the plurality of pixels by:

determining an intensity of each pixel by merging all pixels of the category where the crop is grown in the agriculture land parcel for computing the plurality of seasonal parameters; and determining, using a multi-spectral satellite band processing technique, the plurality of seasonal parameters based on the category with an irrigation facility in the agriculture land parcel.

13. The system of claim 12, the processor is configured to determine an agricultural land area, and an estimation of sowing area of current season using the category of the plurality of pixels.

14. The system of claim 12, wherein the processor is configured to determine the plurality of seasonal parameters by:
- obtaining the temporal profile of each pixel from the NDVI for all seasons of a year; and
- segregating the plurality of pixels based on the temporal profile into a plurality of crops, wherein the temporal profile of a crop area pixel displays a pattern, and the temporal profile of a non-crop area pixel does not display the pattern.

15. The system of claim 12, wherein the processor is configured to determine a agriculture land parcel report based on the score using the plurality of seasonal parameters, wherein the agriculture land parcel report comprises at least one of location details, regional metrics, crop metrics, agriculture land parcel metrics, location of the agriculture land parcel with geotagged boundary, annual rainfall, groundwater condition, crop health or crop moisture chart.

* * * * *